United States Patent [19]
Choy

[11] 4,120,384
[45] Oct. 17, 1978

[54] SHOPPING CART BRAKING APPARATUS

[76] Inventor: Kim L. Choy, 735 28th Ave., San Mateo, Calif. 94403

[21] Appl. No.: 832,347

[22] Filed: Sep. 12, 1977

[51] Int. Cl.² .............................................. B60T 3/00
[52] U.S. Cl. .................................. 188/32; 16/35 R; 280/33.99 C
[58] Field of Search ........... 16/35 D, 35 R; 188/1 D, 188/2 R, 4 R, 32; 248/345.1, 346.1; 280/33.99 C

[56] References Cited

U.S. PATENT DOCUMENTS

| | | | |
|---|---|---|---|
| 1,926,131 | 9/1933 | Wilde | 188/32 |
| 2,512,941 | 6/1958 | Johnson | 16/35 R |

Primary Examiner—Duane A. Reger
Attorney, Agent, or Firm—Henry C. Kohlmann

[57] ABSTRACT

This invention relates generally to devices designed to prevent removal of shopping carts from parking lots of supermarkets. More specifically it relates to a device which incorporates a specially designed wheel which cooperates with a specific surface configuration so as to provide braking of shopping carts when removal thereof from area immediately adjacent to the store, namely a slanted wheel cooperating with slanted raised paved surfaces to cause said wheel to swivel a maximum of 90° about an axis perpendicular to the rotational axis of the wheel thus preventing such rotation.

11 Claims, 5 Drawing Figures

SHOPPING CART BRAKING APPARATUS

BACKGROUND OF THE INVENTION

1. Field of the Invention

This invention relates generally to devices designed to prevent removal of shopping carts from the area immediately adjacent to supermarkets. More specifically this invention relates to devices or systems designed to cause braking of the shopping cart if removal of the same from the store or parking lot area is attempted.

2. Description of the Prior Art

Many devices have been disclosed in the prior art which basically fall into two general classes. First, there are those devices typified by U.S. Pat. No. 3,356,185 by ISAACKS which teach braking devices which cause engagement of the wheels of a shopping cart in some manner to prevent rotation directly thus providing the braking of the cart. Second, there are those devices typfied by U.S. Pat. No. 3,405,783 by CLARK which teach entrapment of the wheels of said shopping cart such that either the hub of the wheels or a separate fixed braking member engages the surface of the device.

Unfortunately these prior art devices suffer from several inherent defects. In the first type of device described, the wheel construction is usually very complicated and requires rollers, pins and the like and are anything but maintenance free. They not only are quite expensive to construct in the first instance but require continual adjustment and maintenance.

In the second type of device described above, a necessary element of such invention is surface construction having slots or outright holes in the paved surface for entry of the wheels. Since the boundry about the area wherein such shopping carts are used is usually about the store parking lot or the store front itself the particular surface construction is exposed to considerable foot traffic as well as vehicular traffic. Not only does such a surface construction cause annoyance to vehicular passengers but also creates a real danger to pedestrians attempting to cross such devices and the risk of injury to persons attempting to shop at the market is substantially increased. Finally, the very appearance of such devices is fixed such that an offensive construction must permanently remain part of the surface surrounding the market.

All of the above problems have been solved by the instant invention as will be described herein and in accordance therewith it is an object of this invention to provide a braking apparatus for shopping carts which allows a very simple and maintenance free wheel construction.

It is a further object of this invention to provide a braking apparatus which need not be manually reset nor which will be prematurely engaged.

It is a further object of this invention to provide a braking apparatus which eliminates slots, curbes or holes in the surface over which the cart travels thereby eliminating risk of injury.

It is a further object of this invention to provide a braking apparatus which cooperates with a surface area which can be arranged in a plurality of esthetically pleasing configuration.

DESCRIPTION OF THE PREFERRED EMBODIMENT

Figure 1:
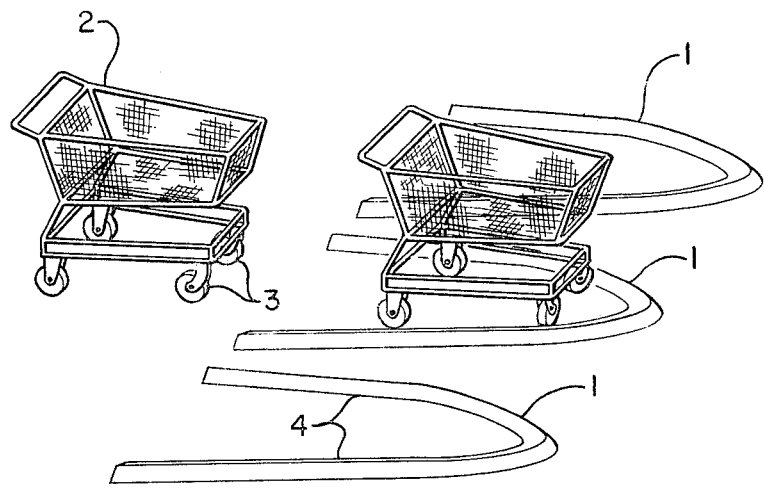
FIG. 1 is a view of a shopping cart entering the prepared braking surface.

With reference to the drawings, FIG. 1 illustrates the placement of braking surfaces 1 on paved areas surrounding a supermarket. Only a portion of such surfaces are shown for illustration purposes but it is contemplated that such surfaces be distributed about the perimeter of the area within which shopping carts are to be contained.

The essence of the invention is the cooperation of the swivel wheels 3 of a shopping cart 2 with the braking surface 1 such that when the cart 1 proceeds onto the braking surface the swivel wheels 3 are forced into a direction perpendicular to the motion of the cart 2 thereby ceasing their rotation and causing a braking action. The wheels 3 of the cart 2 are forced into such position by the action of the braking surface against the wheel 3. The braking surface has an inner slopping surface 4. The angle of said inner surface gradually increased as one proceeds along the length of the braking surface until the wheel 3 begins to loose directional control due to the fact that its lower surface looses contact with the ground 5 as shown in FIG. 2a. The angle of incidence of said wheel 3 equalizes with the inner surface 4 by rotation of said wheel 3 about its vertical axis and tends to guide itself down hill. If the braking surface were only on one side of said cart 2 it would cause the same to turn away from the braking surface, however, it is contemplated that braking surfaces 1 shall be so placed as to affect both wheels 3 at the same time. Thus as shown in FIG. 1 when cart 2 enters the braking surface area it will be caused to turn into but another braking surface. When this occurs both wheels 3 will attempt a down hill direction in opposition to one another. Any attempt to push the cart 2 further will cause the wheels to assume a position perpendicular to the motion of said cart and cause a braking action. If an attempt is made to straddle the arms of braking surfaces 1 as shown in FIG. 1, the braking action will still result except that the wheels 3 will assume a perpendicular position outwardly from the center of said cart as opposed to the inwardly direction as in the first instance.

Figure 2:
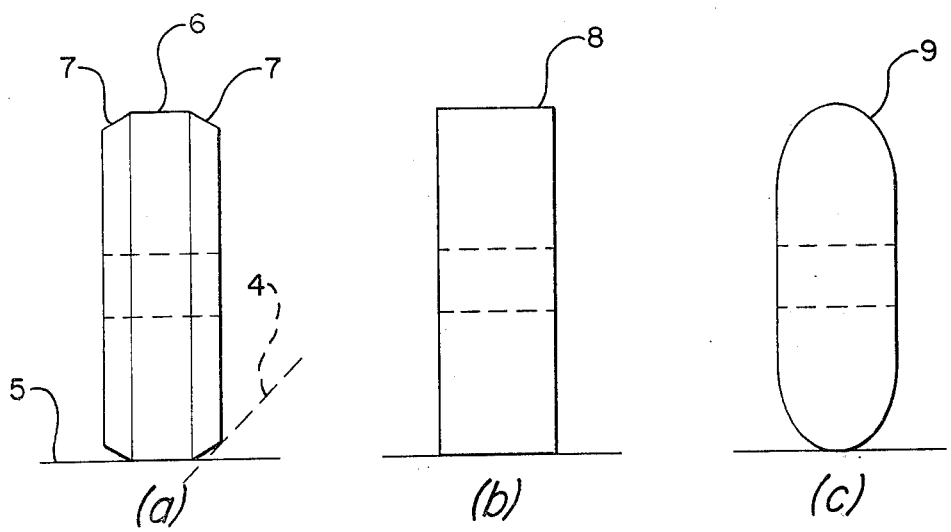
FIG. 2 (*a*), (*b*), and (*c*) are end views of the various wheels which operate on the braking surface.
Figure 4:
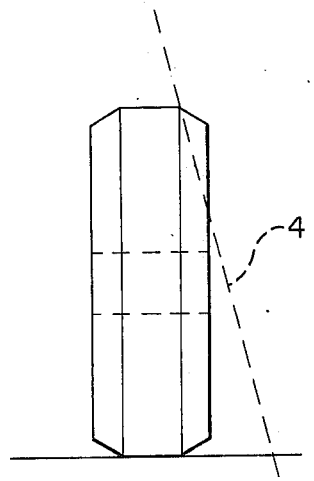
FIG. 4 is a top view of the preferred wheel engaging the braking surface.

This braking action is further enhanced by providing a special wheel as illustrated in FIG. 2(*a*) which is simply the wheel 3 having slanted edges 7 thereon. This allows a flat surface 6 which provides good directional control while on a flat surface 5 but also urges the wheel 3 inwardly as the inner surface 4 angles inwardly as shown by the dotted line in FIG. 4.

It should be noted that any wheel configuration will operate on said braking surface such as the squared wheel 8 of FIG. 2(*b*) and the rounded wheel 9 on FIG. 2(*c*). However, the squared wheel 8 is not urged into a braked position easily and the rounded wheel 9 does not give good directional control when on a flat surface.

It is contemplated that both the slope 4 and the outer slope 10 of said braking surfaces be gradually increasing in opposite directions thus a cart 2 will be braked in either direction. Further, since the braking surface comprises only sloping surfaces and has no holes or slots therein it is safe for pedestrians to cross the same and motorists driving into and out of the parking lot will sense no unpleasant bumps or noises.

The wheels 3 of said cart 2 are modified only in their shape and require no maintenance other than that required for any other wheels. Preferably the wheels 3 are made of hard rubber so as to provide a good braking action but any wheel made of any material that allows braking may be used.

Figure 5:
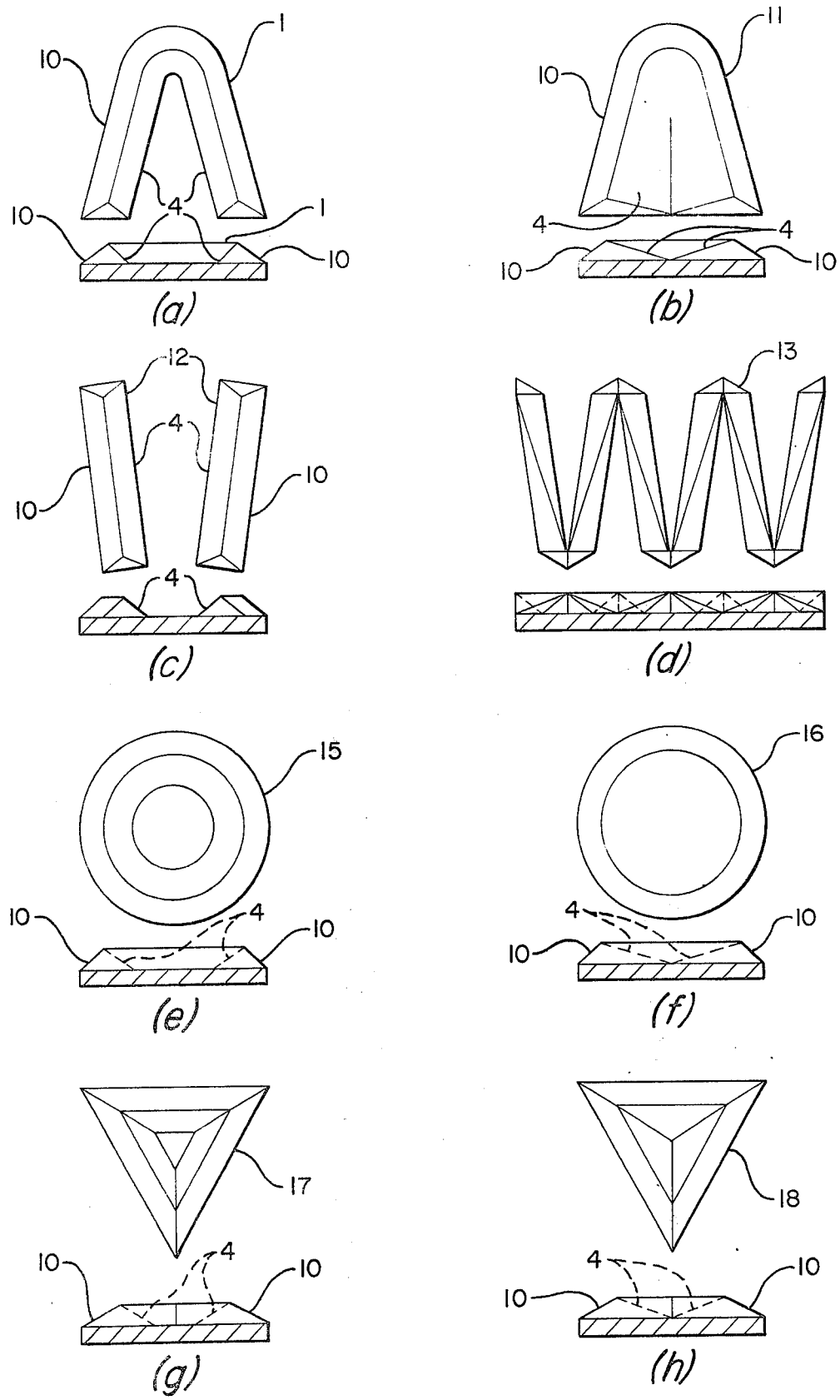
FIG. 5 (*a*), (*b*), (*c*), (*d*), (*e*), (*f*), (*g*) and (*h*) are alternate braking surfaces for a more esthetical appearance of said surface.

The principle of this invention may be incorporated into an infinite variety of braking surfaces as shown in FIG. 5 so as to be more esthetically pleasing to the eye. Those shown in FIG. 5 in both top and side views are as follows:

FIG. 5(a) shows the "U" shaped braking surface 1 of FIG. 1.

FIG. 5(b) shows a variation 11 of the "U" shape of FIG. 1 having no central flat surface therein.

FIG. 5(c) shows a linear braking surface 12 angled and spaced apart.

FIG. 5(d) shows a linear braking surface 13 formed into a continuous "V" shaped configuration.

FIG. 5(e) shows a circular braking surface 15 having a central flat area.

FIG. 5(f) shows a circular braking surface 16 having a continuously sloping center section.

FIG. 5(g) shows a triangular braking surface 17 having a flat center section.

FIG. 5(h) shows a triangular braking surface 18 having a continuously sloping center section.

All such configurations will cause braking so long as the angle of slope of the braking surface at some point exceeds the angle of the slant of the edges of the wheel 3.

Figure 3:
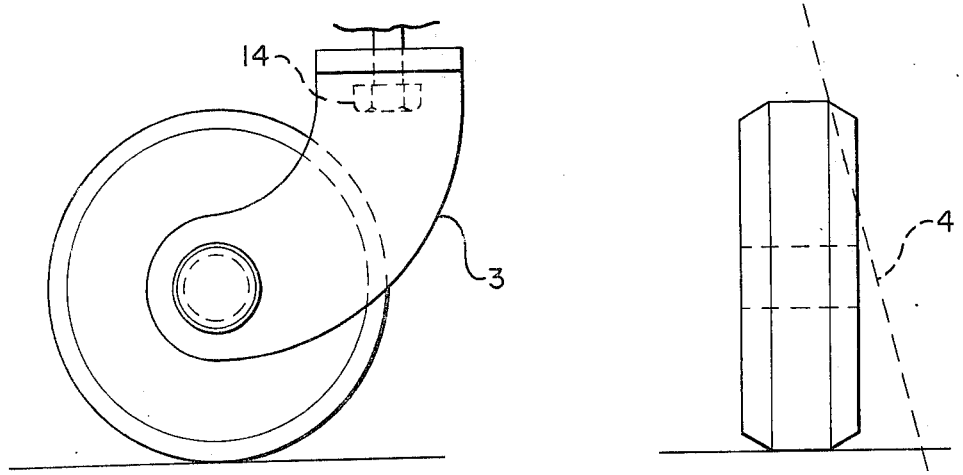
FIG. 3 is a side view of the conventional wheel carriage structure on shopping carts.

Further, there is no reason why the braking action cannot also operate on the rear wheels of said cart 2 so long as a swivel connection 14 is provided as shown in FIG. 3.

The foregoing is considered illustrative only of the principles and specific embodiment of the invention. Further, since numerous modifications and changes will readily occur to those skilled in the art, it is not intended to limit the invention to strictly that described herein but such is to include all modifications and equivalents falling within the scope of the invention herein claimed.

I claim:

1. A shopping cart braking apparatus comprising:
   a. a shopping cart having swivel wheels,
   b. sloped opposing surfaces spaced having a gradually increasing angle of incidence proceeding along the length of said surfaces, which engage said wheels, whereby said sloped surfaces cause said wheels to swivel into a position transverse to the direction of motion of the shopping cart thereby braking the same.

2. A shopping cart braking apparatus as claimed in claim 1 wherein said sloped surfaces further comprise:
   a. opposing surfaces which lie on convergent longitudinal axis.

3. A shopping cart braking apparatus as claimed in claim 1 which further comprises:
   a. a non-opposing sloped surface contiguous to each of said sloped surfaces.

4. A shopping cart braking apparatus as claimed in claim 1 wherein said swivel wheels have slanted sides thereon.

5. A shopping cart braking apparatus as claimed in claim 4 wherein said slanted sides form an angle with the horizontal less than that formed by the sloped surface.

6. A shopping cart braking apparatus as claimed in claim 4 wherein said angle of incidence increases from less than that of said slanted sides to greater than the angle of said slanted sides.

7. A shopping cart braking apparatus as described in claim 1 wherein said sloped surfaces further comprise:
   a. a circular inner sloped surface, and
   b. a circular outer sloped surface contiguous to said inner surface.

8. A shopping cart braking system comprising:
   a. a shopping cart having swivel wheels;
   b. sloped surface members adapted for receiving said wheels; and
   c. slanted sides of said wheels having an angular incident less than the slope of said surface members.

9. A shopping cart braking apparatus comprising:
   a. slanted surface members spaced apart and having
      (1) slanted opposing inner sides and
      (2) slanted outer sides contiguous therewith;
   b. a conventional shopping cart having a plurality of swivel wheels and in which said wheels have:
      (1) a central flat cylindrical member, and
      (2) a partial connical member depending from at least one side of said cylindrical member.

10. A shopping cart braking system as described in claim 8 wherein said sloped surface members are spaced a distance apart less than the distance between said swivel wheels along at least a part of their length.

11. A shopping cart braking system as described in claim 9 wherein at least two of said swivel wheels are spaced apart a distance equal to the distance between said slanted sides along at least a portion of said sides.